INVENTORS
SALVATORE J. PENZA
FREDERICK L. HAAKE

United States Patent Office 3,170,288
Patented Feb. 23, 1965

3,170,288
NOZZLE SEAL
Salvatore J. Penza and Frederick L. Haake, Oxnard, Calif., assignors to the United States of America as represented by the Secretary of the Navy
Filed June 22, 1962, Ser. No. 204,653
9 Claims. (Cl. 60—35.6)
(Granted under Title 35, U.S. Code (1952), sec. 266)

The invention described herein may be manufactured and used by or for the government of the United States of America for governmental purposes without the payment of any royalties thereon or therefor.

The present invention relates to a nozzle seal and more particularly to a seal which closes a nozzle of a jet propulsion engine prior to its operation and will automatically open the nozzle upon its operation.

In the past nozzles for rocket engines have been sealed by a solid plug which must be blown out with some hazard or manually removed prior to the operation of the rocket motor. Such plugs are especially impractical for rocket type missiles which are launched from the water. Removal of such a plug prior to placing the missile in water would most likely result in the water coming in contact with the rocket motor thus causing undesirable effects. The design of a plug which will adequately seal the nozzle from the water and yet be blown out upon ignition of the rocket motor presents a considerable problem since the better seal that the plug makes the harder it is to blow out and if too much pressure is required to blow the plug out, the missile is likely to be damaged. Further, back pressure within the motor casing is very undesirable because of the likelihood of extinguishing the rocket. The present invention overcomes these problems by providing a device which will seal the nozzle against all exterior elements including pressure and will yet automatically and easily open the nozzle upon ignition of the rocket motor. This is accomplished in the present invention by disposing an inflated bag within the nozzle with the bag snugly engaging an inner periphery of the nozzle so as to maintain a good seal prior to the operation of the engine and constructing the bag of a destructible material so that the bag is bursted after firing the engine, thus causing an immediate collapse of the bag to provide a clear passage for the exhaust gasses to escape from the nozzle.

An object of the present invention is to provide a device which will effectively seal a nozzle prior to its operation and which will automatically open the nozzle upon the nozzle's operation.

Another object is to provide a device for sealing a nozzle which will automatically open upon presenting a fluid pressure at the entrance of the nozzle.

A further object is to provide a device for sealing a nozzle which will exert a minimum of strain or stress on the nozzle when the nozzle is subjected to an external pressure.

Still another object is to provide an inflated device for sealing a nozzle which will give an indication of loss of sealing capability due to a puncture of the device.

Still a further object is to provide a seal for a nozzle which is simple to construct, easy to install and efficient in its operation.

Still another object is to provide a nozzle seal which is opened upon firing a jet engine with a minimum of back pressure into said engine.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
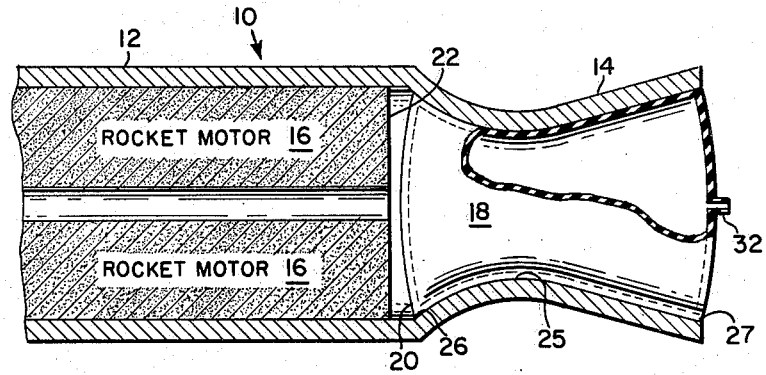
FIG. 1 shows a longitudinal cross-section of a rocket missile and its nozzle with a portion of the seal cut away.

Referring now to the drawing, wherein like reference numerals designate like or corresponding parts throughout the several views, there is shown in FIG. 1 a rocket missile 10 having a body portion 12 and a nozzle 14, the body portion 12 encasing a rocket motor 16. Disposed internally within the nozzle 14 is an impervious inflatable bag 18 which is shaped to conform to the internal surface of the nozzle and has a forward face 20 which faces an aft end 22 of the rocket motor 16 so that upon operation of the rocket motor exhaust gases are impinged directly upon the face 20.

In one embodiment of the invention the nozzle is shaped with a throat 25 of its passage between its inlet 26 and its outlet 27 and the inflated bag 18 is shaped to conform to the internal surface of the nozzle on both sides of the throat 25 as shown in FIG. 1. Accordingly, this embodiment can be subjected to considerable exterior pressures without any noticeable movement of the inflated bag 18 toward the rocket motor 16 because of the refusal of the nozzle at its throat 25 to allow lateral movement of that portion of the inflatable bag 18 downstream from the throat.

Figure 3:
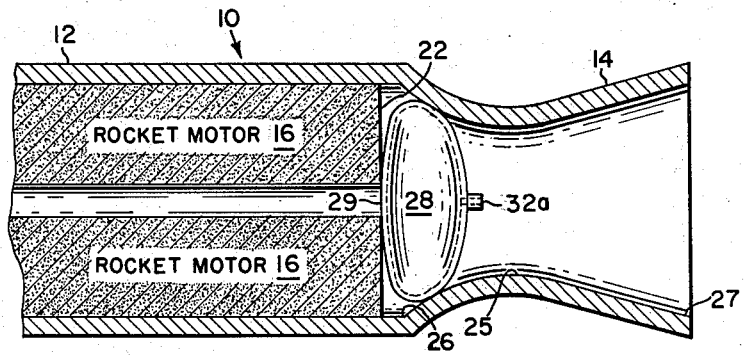
FIG. 3 is a longitudinal cross-sectional view of the rocket missile showing another embodiment of the invention.

FIG. 3 shows another embodiment of the invention wherein a spherical shaped impervious inflated bag 28 is employed having a forward face 29 which is in contact with the aft end 22 of the rocket motor 16. The bag 28 is located between the throat 25 of the nozzle and its inlet 26 so that upon inflation the forward face 29 of the bag is flattened against the aft end 22 of the rocket motor 16 thereby providing a good seal between the bag and the interior surface of the nozzle. Because of the spherical shape of the bag 28 (when removed from the nozzle) it will be very inexpensive to manufacture.

Figure 4:
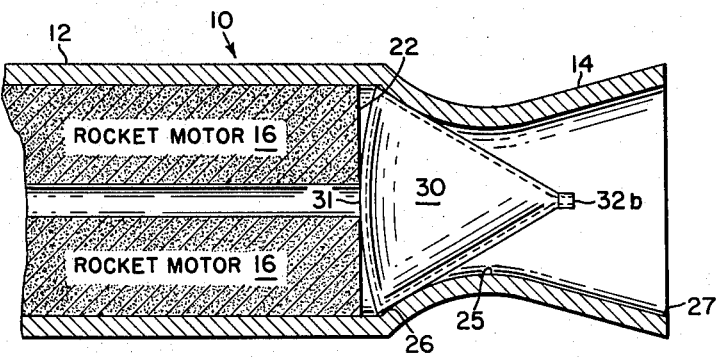
FIG. 4 is a longitudinal cross-sectional view of the rocket missile showing a further embodiment of the invention.
Figure 2:
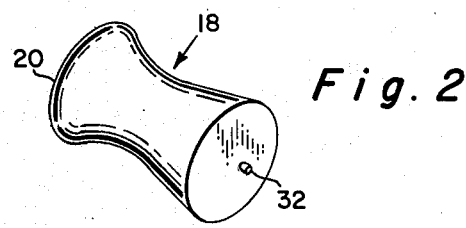
FIG. 2 is an isometric view of the inflated bag shown in FIG. 1, except removed from the nozzle.

FIG. 4 shows a further embodiment of the invention which is a conical shaped impervious inflated bag 30 located on the inlet side of the throat 25 of the nozzle. The forward face 31 of the inflated bag 30 rounds slightly upon inflation of the bag and is flattened against the aft end 22 of the rocket engine in the same manner as that described for the embodiment shown in FIG. 3.

The inflated bags can be pressurized with any suitable fluid such as air and this fluid can be introduced for inflation purposes through valves 32, 32a or 32b. In each of the embodiments the valves 32, 32a and 32b are located clear of that portion of each bag that engages the interior of the nozzle to make the seal. In the embodiments shown there is no need for any other attachment of the bags to the nozzle other than this engagement. The amount of pressure to be introduced within any of the bags in order to obtain an adequate seal between the bag and the interior surface of the nozzle is, of course, a design consideration. If the seal is not adequate at one pressure, the pressure need merely be increased until the seal is adequate.

In all the embodiments the bag is constructed of any suitable resilient and impervious material and at least the forward face of the bag is constructed of a material of a thickness (such as ¼" rubber) that is destructible by exhaust gases from the particular jet propelled engine that is being used. The material is to be impervious to the fluid environment exterior the rocket as well as all undesirable foreign matter within this fluid. In a like manner the material it, of course, to be impervious to the fluid environment within the rocket engine. Rubber has been found to be suitable for the material since it is both resilient and impervious to most fluids. That portion of each bag which engages the interior of the nozzle for sealing is to have a substantially smooth surface over its entirety.

In all of the embodiments the bags extend across the nozzle so as to completely block the passage of the nozzle. This has a two fold function, namely; (1) a puncture of the forward face at any location to cause immediate collapse of the bag and (2) any leaks in the bag will be readily detectable, thus giving indication of the sealing capability of the bag.

It is not be noted that in each embodiment shown in FIGS. 3 and 4 that the seal is dependent upon a means upstream from the forward faces 29 and 31 to engage these faces so that upon inflation the bags will be held in position to apply the engaging pressure between the bags and the interior of the nozzle that is necessary for sealing. The means shown in each of these figures is the rocket motor 16 itself which is positioned about 3″ from the inlet of the nozzle. Of course, other means such as an annular plate would be suitable. Such a means is not necessary for the embodiment shown in FIG. 1 since the bag has a downstream portion that cannot move upstream through the throat 25 within the nozzle.

The inflated bags described above generally have no particular shape in their deflated condition. To install any one of the bags in a nozzle the bag is laid within the nozzle with its forward face facing towards the aft end 22 of the rocket motor 16 and while it is in this position the bag is inflated by applying air through the valves 32, 32a or 32b. The degree of air pressure applied within the bag depends upon the desired pressure between the exterior of the bag and the interior of the nozzle. This pressure is to be sufficient enough to withstand lateral movement of the bag and provide a good sealing engagement when the invention is subjected to an external or internal fluid pressure. After installation of the bag in the nozzle the invention is ready for operation. Prior to ignition of the rocket motor 16 the bag seals the interior of the rocket vehicle from all exterior conditions such as water, dust, moisture and pressure. If the bag is being used for a rocket missile that it to be launched from water the bag will be installed prior to placing the missile in the water and has the advantage that it will be automatically opened upon ignition of the rocket motor 16. Upon ignition of the rocket motor 16 exhaust gases are impinged directly upon the forward face 20, 29 or 31 of the bag, thus puncturing this face and allowing the exhaust gases to enter directly into the bag. The bag is collapsed upon puncturing, thus breaking the resistance of the bag to expulsion from the nozzle 14. This allows the exhaust gases to immediately discharge the bag from the nozzle leaving the nozzle entirely clear for operation of the rocket motor.

It is now readily apparent that the present invention provides a very simple seal which automatically opens the nozzle upon operation of a rocket motor thus eliminating any possibility of damage to the nozzle and greatly increasing operational capabilities. By employing a destructible inflated bag the exhaust gases from the rocket motor can be utilized in a direct fashion to clear the nozzle of the seal so that the rocket engine can be operated for its intended function.

While the seals have ben described for use in a rocket engine their application, of course, extends to any jet propelled type engine.

Obviously many modifications and variations of the present invention are possible in the light of the above teachings. It is therefore to be understood, that within the scope of the appended claims, the invention may be practiced otherwise than as specifically described.

We claim:

1. In combination with an exhaust nozzle of a jet propulsion engine, a device for sealing the nozzle from an external environment and capable of automatically opening the nozzle upon starting the engine comprising:
    (a) an inflated means constructed of a material that is impervious to fluids;
    (b) said means being disposed within said nozzle and sealably engaging around an interior surface of the nozzle;
    (c) said means extending across and blocking the nozzle's passage so as to seal the interior of the jet engine from said external environment;
    (d) said means further being constructed of a material that is destructible by the jet stream from the engine whereby upon starting the engine the means will be collapsed by puncturing due to the jet stream and the bag will then be discharged from the nozzle so as to allow the immediate and uninterrupted operation of said nozzle.

2. In combination with an exhaust nozzle of a jet propulsion engine, a device for sealing the nozzle from an external environment and capable of automatically opening the nozzle upon firing the engine comprising:
    (a) an inflated bag disposed within said nozzle;
    (b) said bag having an exterior surface portion which sealably engages around an interior surface of the nozzle so as to seal the interior of the engine from said external pressure environment;
    (c) said exterior surface portion being substantially smooth over its entirety so that substantially constant engagement pressure is effected between said portion and the nozzle; and
    (d) said bag having a uniform wall thickness and being constructed of a material that is destructible by the exhaust gases of the engine whereby upon firing the engine the bag will be collapsed by puncturing due to exhaust gases and the bag will then be discharged from the nozzle so as to allow the immediate and uninterrupted operation of said nozzle.

3. In combination with an exhaust nozzle of a rocket engine, a device for sealing the nozzle from an external environment and capable of automatically opening the nozzle upon firing the rocket comprising:
    (a) an inflated bag disposed within said nozzle;
    (b) said bag having a valve for introducing pressure into the bag for inflation purposes;
    (c) said bag having an exterior surface portion which sealably engages around an interior surface of the nozzle so as to seal the interior of the rocket engine from said external environment;
    (d) said valve being entirely clear of said exterior surface portions; and
    (e) said bag being constructed of a material that is destructible by the exhaust gases that are to be discharged from the nozzle upon firing;
whereby upon firing the rocket the bag will be collapsed by puncturing due to exhaust gases and the bag will then be discharged from the nozzle so as to allow the immediate and uninterrupted operation of said nozzle.

4. In combination with an exhaust nozzle of a rocket engine, a device for sealing the nozzle from an external pressure environment and capable of automatically opening the nozzle upon firing the rocket comprising:
    (a) said nozzle having a passage;
    (b) said passage having at least a portion which converges from an upstream end toward a downstream end;
    (c) an inflated bag disposed within said portion of the nozzle; said bag being removably insertable through the exit end of the nozzle in a deflated condition;

(d) means associated with the rocket engine for preventing the bag from moving upstream when in its inflated condition;
(e) said bag sealably engaging around an interior surface of the nozzle which forms said portion of the passage so as to seal the interior of the rocket engine from said external pressure environment;
(f) said bag being constructed of a material that is destructible by the exhaust gases that are discharged from the nozzle upon firing;

whereby prior to firing the bag holes its position within the nozzle due to the converging shape of said portion and after firing will be collapsed by exhaust gases puncturing the bag whereupon the bag will be discharged from the nozzle so as to allow the immediate and uninterrupted operation of said nozzle.

5. An exhaust device as claimed in claim 4 wherein said means comprises:
(a) the passage of the nozzle having a portion contiguous the converging portion which diverges toward said downstream end; and
(b) said bag has a portion inflated within the diverging portion and snugly engaging the interior of the nozzle forming the diverging portion so as to restrain the bag from moving upstream within said nozzle.

6. An exhaust device as claimed in claim 4 wherein:
(a) said bag upon inflation outside of said nozzle is substantially spherical in shape.

7. An exhaust device as claimed in claim 6 wherein said means comprises:
(a) the rocket engine having a rocket grain located in close proximity to the upstream end of said nozzle so as to engage the bag in its inflated condition.

8. An exhaust device as claimed in claim 4 wherein:
(a) said bag upon inflation outside of said nozzle is substantially conical in shape, an apex of the conical bag pointing downstream when mounted within the nozzle.

9. In combination with an exhaust nozzle of a rocket engine, a device for sealing the nozzle from an external pressure environment and capable of automatically opening the nozzle upon firing the rocket comprising:
(a) said nozzle having a passage with a throat between the inlet and outlet openings of said nozzle;
(b) an inflated bag disposed within said nozzle on both sides of said throat and having a shape such that the bag sealably engages around an interior surface of said nozzle on both sides of the throat thereby sealing the interior of the rocket engine from an external pressure environment;
(c) said bag having a valve which is openable into said bag at a location entirely clear of that portion of the bag which engages the nozzles; and
(d) said bag having a relatively flat surface which is directly exposed to exhaust gases upon firing the engine and which extends completely across the nozzle so as to completely block the nozzle's passage; and
(e) said surface of the bag being constructed of a material that will be destroyed by the gases upon firing, whereby prior to firing the bag holds its position within the nozzle due to the throat of said passage and after firing will be collapsed by exhaust gases puncturing the bag whereupon the bag will be discharged from the nozzle so as to allow the immediate and uninterrupted operation of said nozzle.

References Cited by the Examiner
UNITED STATES PATENTS

| 2,502,458 | 4/50 | Hickman | 60—35.6 |
| 2,744,382 | 5/56 | Sokol et al. | 60—35.6 |
| 2,776,623 | 1/57 | Bonner | 60—35.6 |
| 2,875,577 | 3/59 | Odenkirchen | 60—35.6 |
| 3,053,488 | 9/62 | Cox | 60—35.6 |

SAMUEL LEVINE, *Primary Examiner.*

ABRAM BLUM, *Examiner.*